No. 855,940. PATENTED JUNE 4, 1907.
G. E. DANIELS.
CUTTING BLOCK.
APPLICATION FILED MAR. 25, 1907.

Witnesses:
H. B. Davis
Cynthia Doyle

Inventor:
George E. Daniels
by Noyes & Harriman
Attys

UNITED STATES PATENT OFFICE.

GEORGE E. DANIELS, OF ROWLEY, MASSACHUSETTS.

CUTTING-BLOCK.

No. 855,940.     Specification of Letters Patent.     Patented June 4, 1907.

Application filed March 25, 1907. Serial No. 364,416.

*To all whom it may concern:*

Be it known that I, GEORGE E. DANIELS, of Rowley, county of Essex, Sate of Massachusetts, have invented an Improvement in Cutting-Blocks, of which the following description, in connection with the accompanying drawings, is a specification, like characters on the drawings representing like parts.

In cutting material, such as leather, with cutting dies, it is customary to employ a solid, hard-wood block of sufficient height to provide a work-support at the desired elevation which shall be solid and rigid. Under the conditions in which these blocks are ordinarily used, the wood deteriorates to such an extent within a few years that it becomes worthless for the purpose, and furthermore, the surface of the block ordinarily becomes worn down or cut away by the dies to such an extent that it must be leveled at frequent intervals, with the result that the work-holding face in time becomes too low to enable the block to be conveniently used for the above purpose. The expense of renewing these blocks is, therefore, often an item of considerable importance.

Figures 1, 2:
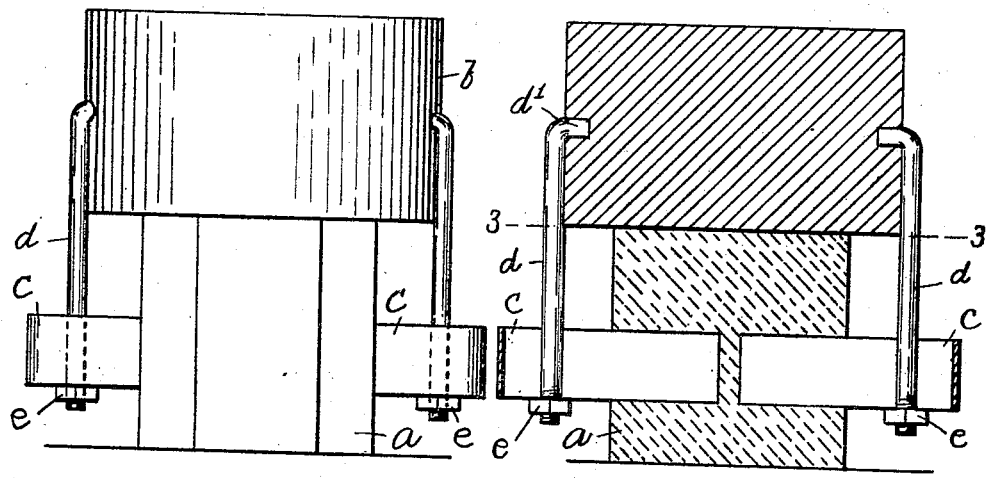
Figure 3:
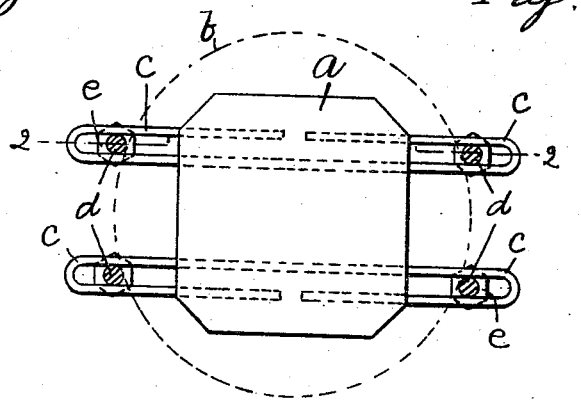

The object of my invention is to provide a form of cutting block which may be renewed at less expense than the expense of securing a new block of the above described character, and which provided a rigid, solid support for the work. I accomplish this object by means shown in the accompanying drawing, in which, Figure 1 is a side elevation of a cutting block made according to my invention. Fig. 2 is a sectional view on the line 2—2 of Fig. 3. Fig. 3 is a bottom plan view.

According to my invention I provide a supporting base $a$, which may be of concrete, cast-iron or other suitable solid or heavy material, and a wooden block $b$, which is adapted to rest on said base and to be supported thereby with its flat upper surface at the proper level. In order to secure the block rigidly to the base $a$, two pairs of lugs or stirrups $c$ are securely embedded in said base during the casting operation, the opposite lugs of each pair being shown as formed of a continuous flat strip of metal held in a vertical position and doubled on itself to provide an elongated slot in each lug, adapted to receive the shank portion of a dog $d$.

A dog $d$ is provided for each lug, and each dog is provided with an end portion $d'$, bent at right angles to its shank portion, and the block $b$ is provided with a series of holes in its side, corresponding in number and location to the lugs $c$, into which said end portions $d'$ are respectively hooked, as shown in Fig. 2. The shank portion of each dog extends down through the slot of its corresponding lug $c$ and a nut $e$ is threaded upon the lower end of each shank portion, so that, when said nuts are tightened, said block $b$ will be firmly clamped against and secured to the upper side of the base $a$. With this arrangement the same base may be used for blocks of different diameters, as the shanks of the dogs may be adjusted longitudinally of the lugs or laterally of the block, to any position in the slots of said lugs, and one block may be readily substituted for another, or if one end of the block becomes somewhat worn, it may be turned over and fastened so that the opposite end may be used.

Having thus described my invention, what I claim as new and desire to secure by Letters Patent is:—

1. The combination of a wooden die-block, a base on which said block is mounted, a pair of oppositely disposed, laterally projecting lugs rigidly connected to said base and a series of dogs respectively connected to said lugs and said block for clamping the block upon the base, substantially as described.

2. The combination of a wooden die-block, a base on which said block is mounted, a pair of oppositely disposed, laterally projecting lugs rigidly connected to said base and a series of dogs detachably connected to said block and said lugs respectively, said lugs having means permitting connection of said dogs thereto at different longitudinal points thereof, whereby blocks of different diameters may be clamped on said base, substantially as described.

3. The combination of a wooden die-block, a base on which said block is mounted, a pair of oppositely disposed, laterally projecting lugs rigidly connected to said base, and having longitudinal slots therein, a pair of dogs detachably connected to said block and extending through the slots of said lugs respectively, and means engaging said dogs and said lugs at different positions thereof in said slots to clamp said block onto said base, substantially as described.

4. The combination of a wooden die-block, a base of relatively heavy material on which said block is mounted to provide a solid support therefor, a pair of lugs embedded in said base and projecting laterally therefrom, and means for detachably connecting said block and said lugs to clamp the block upon the base, substantially as described.

In testimony whereof, I have signed my name to this specification, in the presence of two subscribing witnesses.

GEORGE E. DANIELS.

Witnesses:
L. H. HARRIMAN,
JOHN A. MARSHALL.